Dec. 20, 1960 W. J. SHANAHAN ET AL 2,965,702

TELEVISION

Filed May 9, 1956 2 Sheets-Sheet 1

INVENTORS
WILLIAM J. SHANAHAN
RICHARD F. VETTER
EDWARD I. SACKS
BY Cushman, Darby & Cushman
ATTORNEYS Dec. 20, 1960 W. J. SHANAHAN ET AL 2,965,702

TELEVISION

Filed May 9, 1956 2 Sheets-Sheet 2

INVENTORS
WILLIAM J. SHANAHAN
RICHARD F. VETTER
EDWARD I. SACKS
BY Cushman, Darby & Cushman
ATTORNEYS

United States Patent Office 2,965,702

Patented Dec. 20, 1960

2,965,702

TELEVISION

William J. Shanahan, Forest Hills, Richard F. Vetter, Malverne, and Edward I. Sacks, Bayside, N.Y., assignors to Skiatron Electronics & Television Corporation, New York, N.Y., a corporation of New York Filed May 9, 1956, Ser. No. 583,809

7 Claims. (Cl. 178—5.1)

This invention pertains to apparatus for scrambling signals such as television and like signals.

Systems for the transmission and reception of scrambled television and the like have been described wherein the video signals are transmitted in different modes from time to time. For example, in television systems video signals may be delayed with respect to transmitted horizontal synchronizing signals, there being variable delay times to establish various modes. For example, the mode or delay of the video signals may be altered from field to field, or line to line. The present invention describes a system for causing a reversion at predetermined times of the mode, from whatever it may be, to another given mode.

It is therefore a primary object of this invention to provide apparatus for imparting increased scrambling to a transmission such as a television transmission.

It is a further object of the invention to provide such apparatus wherein the mode of television video signals normally shifted from mode to mode in accordance with a predetermined code may be additionally changed or reverted at predetermined times to a given mode to compound the coding of the system.

Further objects and the entire scope of the invention will be in part expressed and in part obvious from the following detailed description of exemplary embodiments of the invention, and from the appended claims.

The invention may be further understood with reference to the accompanying drawings, wherein.

Figure 1:
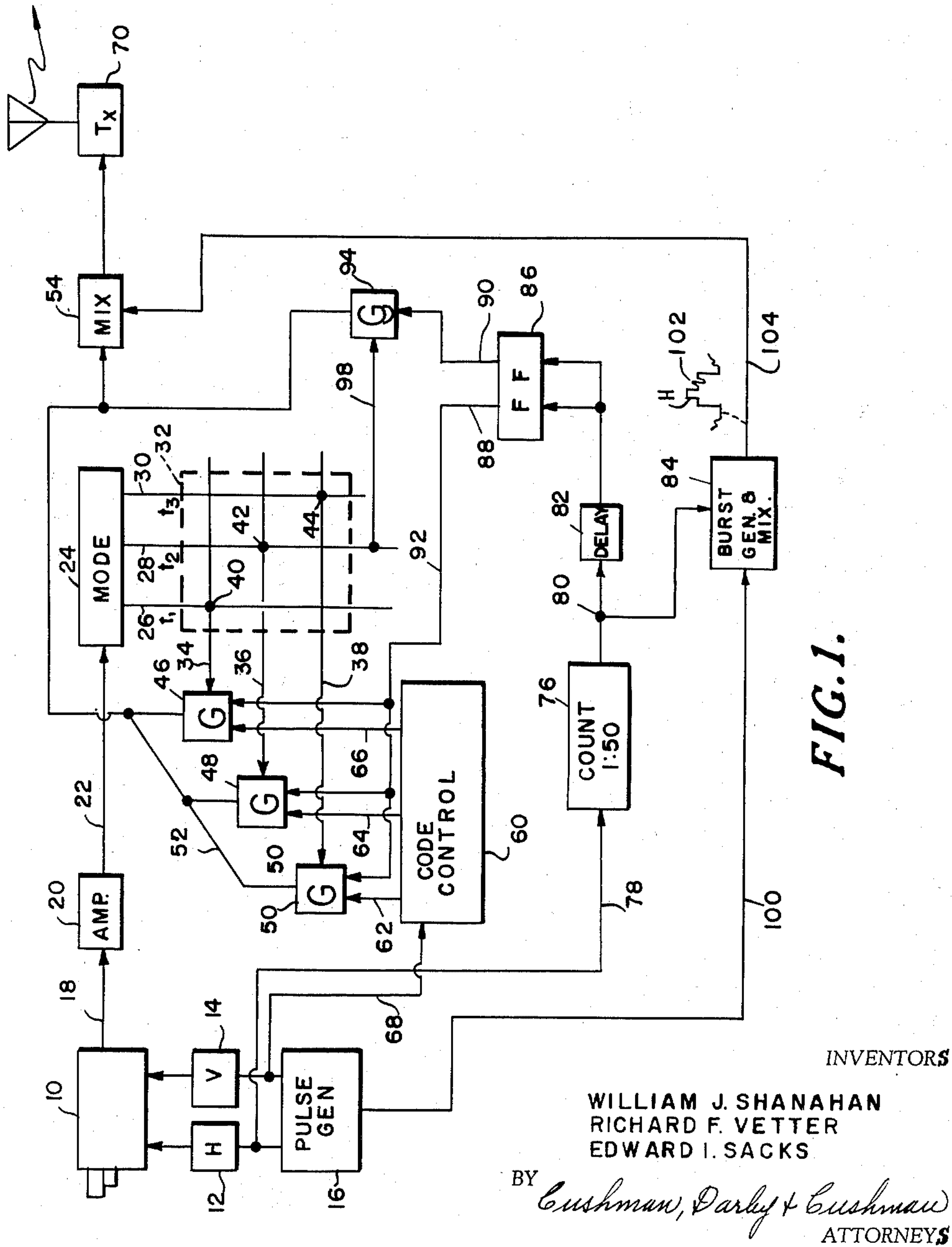
Figure 1 shows transmitting apparatus according to the invention.

Referring to Figure 1, reference character 10 designates a television camera under control of horizontal sweep oscillator 12 and vertical sweep oscillator 14, these oscillators being provided with driving pulses from master pulse generator 16. The video signals issuing from cameras 10 on line 18 may be amplified as desired in amplification circuits 20 and then applied over line 22 to a mode circuit 24. Mode circuit 24 may be any of a variety of circuits, the purpose thereof being to provide on a plurality of output lines such as 26, 28 and 30, the video or like signals in differing modes. For example, the signals on lines 26, 28 and 30 could be video signals delayed by differing amounts with respect to the video signals on input line 22. Or, the signals on output lines such as 26 and 28 could be relatively inverted. No limitation to the particular nature of the modes is required or intended. For convenience, it will be assumed that the mode circuit 24 is a delay line tapped along its length and the signals on line 26 are delayed by a time period $t_1$ from the signals on line 22, on line 28 by an amount $t_2$ and on line 30 by an amount $t_3$. Preferably, four such delays total only a limited percentage of a time sweep period.

The lines 26, 28 and 30 from the mode circuit 24 may form one grid of a matrix shown within dash line 32.

Also within matrix 32 are horizontally extending lines 34, 36 and 38. Dots 40, 42 and 44 within the matrix show connections between the respective lines, any absence of a dot showing no connection. It is to be understood that under differing code arrangements the interconnections within the matrix may be altered. A convenient manner of permitting alterability of the connections is by use of record cards bearing printed circuits.

Line 34 serves as an input to a gate circuit 46, line 36 to a gate circuit 48 and line 38 to a gate circuit 50. The outputs of gates 46, 48 and 50 are collected on a common line 52 which extends to serve as an input to a mixing circuit 54.

The transmitting apparatus is further provided with a code control circuit 60. This circuit may take a variety of forms, the purpose of the circuit being to provide at differing times, a different enabling output on one or more output lines. As by one example, and no limitation is intended or required, the code control circuit 60 may be an electronic commutation device having three output lines 62, 64 and 66. Circuit 60 may be such that by repeated energization by vertical driving pulses over line 68, the output lines 62, 64 and 66 in some sequence carry a relatively high potential so as to "open" the one of gates 46, 48 or 50 to which it is connected.

The arrangement of camera 10, mode circuit 24, matrix 32, gates 46, 48 and 50 and the code control circuit 60 in the form of an electronic commutation device, is more fully explained in the copending applications of William J. Shanahan, Serial No. 481,423, filed January 12, 1955, now Patent No. 2,912,486, and Serial No. 481,424, filed January 12, 1955, both assigned to the assignee of the present invention. The same situation but with the code control circuit in the form of a pulse-group responsive matrix for selectively energizing output lines, is also described in said copending applications. Code control circuits responsive to regularly occurring or randomly occurring input pulses in coded groups, are further explained in detail in copending application Serial No. 418,642, filed March 25, 1954. Any of these arrangements are suitable for code circuit 60 of the present invention.

While any type of code control circuit as aforesaid may be employed, let it be assumed for convenience that the circuit 60 is an electronic commutation device which steps through a cycle every three vertical driving pulses on input line 68, in keeping with the disclosures of the aforementioned copending applications. The operation of the transmitting apparatus will be as follows: with the code control circuit in an instantaneous position so that the first output line 62 is enabled, gate 50 will be opened (ignoring for the moment an additional input control line) and video signals delayed by time $t_3$ will pass through connection 44 and through gate 50 to the mixing circuit 54 and thence through transmission circuits 70. The next vertical driving pulse will step the circuit 60 at the end of say a field period to enable line 64 to now open gate 48, while gates 46 and 50 are closed. Now the video signals will be delayed by time period $t_2$, at the next vertical driving pulse gate 46 will be opened and video signals will come through with time delay $t_1$. Again, rearrangement of connections in the matrix will provide a different code situation for a different transmission period.

Now coming to the point of the present invention, means is provided for positively changing or reverting the video selection to a given mode, at predetermined times. This means includes a count-down circuit 76 having an input responsive preferably to horizontal driving pulses on line 78. The counter circuit may count down, say, 1 in 50, so that after every 50 input or horizontal driving pulses on line 78, an output pulse appears at a junction 80.

This pulse is applied to a delay circuit 82 and to one input of a mixing circuit 84 to be described below. The output of delay circuit 82 feeds both inputs of a flip-flop circuit 86 having a first output line 88 and a second output line 90. Every pulse at junction 80, delayed in circuit 82, will shift the flip-flop 86 from whatever position it occupies to its opposite state. In one state, the output line 88 will carry a relatively high potential and the output line 90 a relatively low potential. Upon shift of the flip-flop circuit, the conditions of high and low potentials will be interchanged. Such circuits are well known in the art and need not be further described.

The output line 88 of flip-flop 86 is connected in common over line 92 as a third input to each of gates 46, 48 and 50. The output line 90 of flip-flop 86 is connected as one input to a gate circuit 94. The output of gate circuit 94 is conveyed over line 96 to mixer circuit 54. The second input to gate circuit 94 is over line 98 which has a connection to one of the output lines of the mode circuit 24, say the output line 28, although this could be any one of the other output lines and no limitation is required.

The operation of the circuitry is as follows: an output from counter circuit 76 while flip-flop 86 is in a state having line 88 at the high potential will shift it so that line 88 reduces in potential and the high potential appears on line 90. At this time, gates 46, 48 and 50 will be closed and gate 94 opened. In this case, the system has no alternative but to apply only the video delayed by time $t_2$ to the mixer circuit 54. However, upon the next output pulse of the counter circuit 76, the situation will be reversed, and gate 94 will be closed and gates 46, 48 and 50 opened. The system will go back to its normal operation until a still further pulse from counter 76, whereupon the $t_2$ mode will be invariably selected. This will give a serrated effect to the picture if a submultiple of the horizontal driving pulse frequency is employed, such as the exemplary 1 to 50 count-down just described.

It will be apparent that the line 98 could be connected to the mode output line 26 or 30. This may also be altered to provide a change in the coding sequence, just as the connections 40, 42 and 44 may be rearranged.

As will become further apparent, it is necessary to somehow synchronize a code control circuit at the receiver so as to maintain the reverting of the system to a given mode at given times, in synchronism with the transmitter. At the transmitting apparatus as shown in Figure 1, the mixing circuit 84 is provided for this purpose. An output line 100 from the master pulse generator 16 carries composite synchronizing signals for eventual transmission in the usual manner. These are applied as a second input to mixer circuit 54, the function of which is to add to the synchronizing pulses a characteristic burst of frequency or other identifying characteristic. For example, a frequency burst 102 may be added to the back porch of a horizontal synchronizing pulse which occurs in predetermined time proximity to the output of counter 76. The addition of a tone burst to the back porch of a horizontal synchronizing pulse is well known in color television, for example, and no detail explanation of circuit 84 is required in the present application. The so modified composite synchronizing signals are available on line 104 which extends to mixer circuits 54.

In Figure 1, the purpose of delay circuit 82 is to delay the output from counter 76 over what is left of a line scan, so that the reversion of flip-flop 86 may occur during the next horizontal fly-back time period. The delay circuit 82 may not in all cases be required, but is suggested because the requirement of transmitting an identifying signal, such as burst 102, may consume some time, particularly in view of the requirement of separating the burst and generating a control signal at the receiver. If delay circuit 82 delays for the residue of a line scan, it is to be expected that the control signal may be transmitted, detected and applied to similar circuitry at the receiver also within the given line scan period.

Figure 2:
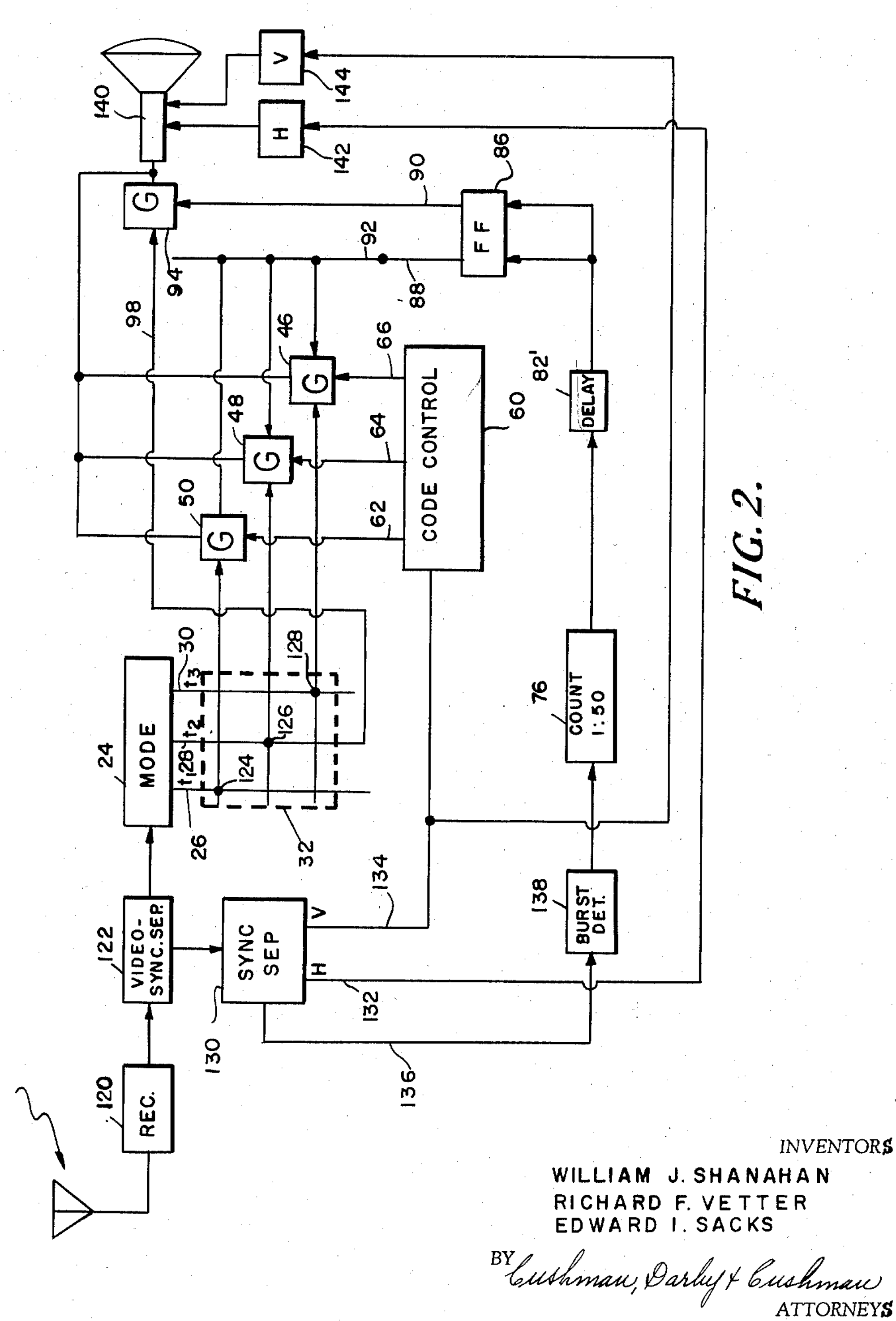
Figure 2 shows receiving apparatus according to the invention.

Figure 2 shows exemplary receiving apparatus according to the invention. To demonstrate the similarity to the transmitting apparatus wherever components are the same, like reference characters are employed. However, different types of equipment may be used at transmitters and receivers, if desired. Signals received at the receiving antenna may be detected in receiving circuits 120 and then applied to circuits 122 for separating video signals from synchronizing signals. The video signals are then applied to mode circuit 24 having the same characteristics as the mode circuit 24 at the transmitter. Gates 46, 48 and 50 have first inputs from output lines 62, 64 and 66 of a code control circuit 60. The second input to gates 46, 48 and 50 is from connections within matrix 32. The connections are here designated 124, 126 and 128 inasmuch as they differ from the connections in the matrix 32 of the transmitter so that a complementary delay may be introduced, where the mode circuit 24 is taken to be a tapped delay line. That is, the transmitter connection 44 is on line 30 of mode circuit 24, giving three time units of delay $t_3$. Accordingly gate 50 at the receiver is connected to mode output line 26 to introduce but one time unit of delay $t_1$. The total time units of delay is four. Gate 46 at the transmitter by connection 40 introduces by one time unit of delay and therefore gate 46 at receiver by connection 128 adds three more time units of delay, to provide a total of four time units. The third input to gates 46, 48 and 50 at the receiver is by connection to output line 88 of flip-flop circuit 86. Further similar to the transmitting apparatus, the output line 90 of flip-flop 86 is connected as one input to gate 94. The other input to gate 94 is over line 98 connected to the output line 28 of mode circuit 24.

At the receiver the synchronizing signals separated from the video at circuits 122 are applied to synchronizing signal separating circuits 130, for producing horizontal driving pulses on line 132 and vertical driving pulses on line 134. Additionally, the horizontal synchronizing signals may be applied over line 136 to a detector circuit 138 for detecting the burst 102 (Fig. 1) which exists on the back porch of certain horizontal synchronizing pulses to synchronize a counter circuit 76 at the receiver. The nature of the detector circuit 138 will be well understood, such burst detection being known in currently used color television, for example, and no further explanation is required. The output pulses from counter 76, which may produce a pulse for every 50 input pulses, as is the case at counter 76 at the transmitter, are applied to delay circuit 82′ and thence to flip-flop circuit 86. The delay of circuit 82′ will be adjusted so that sufficient time is given for separation of the horizontal pulses at circuit 130, detection of the burst at circuits 138 and any delays in counter circuit 76, so that the flip-flop 86 may be shifted during horizontal fly-back times, to avoid disrupting lines of scan. As was stated with regard to the transmitting equipment, it may be possible to avoid the use of delay circuits 82 and 82′ if the other circuits are designed to operate with sufficient rapidity.

The receiving circuit is further characterized by the usual display means 140 operated under control of horizontal oscillator 142 and vertical oscillator 144.

Assuming the code control circuit 60 at the receiver to be a commutation device as at the transmitter, it is under control of vertical driving pulses on line 134. Accordingly the code control circuit 60 at the transmitter and receiver will remain in step. More elaborate means, as described in copending applications Serial No. 481,423 and Serial No. 481,424 may be employed for maintaining the code control circuits in step, for arbitrarily recycling same, etc. It will be further understood that the code control circuits may be responsive to pulse groups, these pulses being transmitted mixed with the video signals or with the audio signals, again as fully described in aforesaid copending applications Serial Nos. 481,423, 481,424, and 418,642. The explanation of the present invention in terms of an electronic commutation device for control circuits 60, and in terms of a back-porch burst, is made only for convenience. Synchronization between the transmitter and receiver code control circuits 60, both initially and during operation thereof, is necessary, and according to the particular form such circuits take, an appropriate synchronization system therefor may be taken from one of the aforementioned applications.

It should now be apparent that with the connections in matrix 32 at the receiver made to introduce complementary delay times or other mode characteristics, an authorized receiver will present the total and complete picture on display device 140. However, it will be further apparent that a non-authorized receiver, not having the equipment shown in Figure 2, will present a severely scrambled picture. Over and above the degree of scrambling or secrecy imparted by the systems of the aforementioned copending applications, the technique of reverting the mode to a given mode at predetermined times, gives the picture a further serrated effect. Where the reversion is responsive to a count-down of horizontal driving pulses which does not come out to be an even multiple of the field frequency, the serrations will crawl on the screen, further imparting secrecy to the system.

The foregoing detailed description of an exemplary embodiment of the invention has been given only for purposes of illustration and the true scope of the invention is to be determined from the appended claims.

What is claimed is:

1. In a scrambled information signal system, means for producing information carrying signals in any one of a plurality of modes including means for changing the mode of the information carrying signals from time to time in a coded manner, and means for temporarily disabling the mode changing means and causing the information carrying signals to invariably be in a given one of said modes while the mode changing means is disabled.

2. A system as in claim 1 wherein the said disabling and given mode causing means includes means for effecting the disabling and concurrent given mode at a repetition frequency which is greater than the frequency of mode changing by said mode changing means.

3. A system as in claim 2 wherein the greater repetition frequency effecting means causes the disabling and concurrent given mode to recur at regularly spaced times.

4. In a scrambled television transmission system, transmitting apparatus and at least one receiving apparatus, the transmitting apparatus including means for establishing and shifting the video signals between a plurality of different modes during predetermined time periods, means for alternately enabling and disabling the video signal shifting means during any one of said time periods and causing the video signals to invariably be transmitted in a given one of said modes while the shifting means is disabled but allowing shifting between modes as aforesaid while the shifting means is enabled, and means for generating and transmitting an indicative signal each time the shifting means is enabled or disabled, the receiving apparatus including mode resolution means for resolving the received mode into a given resultant mode during said predetermined time periods in synchronism with the transmitting apparatus, and means responsive to alternate ones of said indicative signals for causing during any one of said time periods and until the next indicative signal is received the mode resolution to invariably be a given mode resolution characteristic corresponding to said given mode.

5. A system as in claim 4 wherein the enabling disabling means effects at least its disabling function of the shifting means at regularly recurring times.

6. A system as in claim 5 wherein the system has given horizontal and vertical scan repetition rates and includes means for causing effective mode changes due to the shifting means and resolution means at most once for each vertical scan, and wherein the repetition rate of said indicative signals is a sub-harmonic of the said horizontal repetition rate and other than an even multiple of the said vertical repetition rate.

7. In a scrambled television system, a plurality of output lines, means for respectively deriving on said output lines a corresponding plurality of signal modes, a group of gating means individually coupled to said lines for passing, when enabled, the respective signal mode, at least one other gating means coupled to a single one of said output lines for passing, when enabled, the signal mode associated therewith, means for collecting the outputs of all of said gating means at a common point, and means for mutually exclusively disabling said other gating means and said group of gating means.

References Cited in the file of this patent

UNITED STATES PATENTS

| | | |
|---|---|---|
| 2,697,741 | Roschke | Dec. 21, 1954 |
| 2,755,333 | Druz | July 17, 1956 |
| 2,769,854 | Bridges | Nov. 6, 1956 |
| 2,770,672 | Druz | Nov. 13, 1956 |
| 2,816,156 | Pawley | Dec. 10, 1957 |

Notice of Adverse Decision in Interference

In Interference No. 92,085, involving Patent No. 2,965,702, W. J. Shanahan, R. F. Vetter, and E. I. Sacks, Television, final decision adverse to the patentees was rendered Mar. 18, 1963, as to claim 1.

[*Official Gazette August 27, 1963.*]

Notice of Adverse Decision in Interference

In Interference No. 92,085, involving Patent No. 2,965,702, W. J. Shanahan, R. F. Vetter, and E. I. Sacks, Television, final decision adverse to the patentees was rendered Mar. 18, 1963, as to claim 1.

[*Official Gazette August 27, 1963.*]